United States Patent [19]

Draplin et al.

[11] Patent Number: 4,771,507

[45] Date of Patent: Sep. 20, 1988

[54] AUXILIARY FOLDING SEAT HINGE ARRANGEMENT

[75] Inventors: Thomas E. Draplin, Southfield; Janice E. Cote, Ann Arbor; Matthew E. Dukatz, Bloomfield Hills, all of Mich.

[73] Assignee: Chrysler Motors Corporation, Highland Park, Mich.

[21] Appl. No.: 44,671

[22] Filed: May 1, 1987

[51] Int. Cl.⁴ .......................... E05F 1/08; B60N 1/02
[52] U.S. Cl. ........................................ 16/297; 16/304; 16/332; 16/334; 16/347; 16/348; 296/65.1; 297/334
[58] Field of Search ................. 16/286, 293, 297, 304, 16/321, 332, 334, 347, 348, 352, 357; 296/63, 65 R; 297/332, 333, 334, 378, 379, 355

[56] References Cited

U.S. PATENT DOCUMENTS

| | | | |
|---|---|---|---|
| 2,653,036 | 8/1953 | Creel et al. | 16/332 |
| 2,670,020 | 2/1954 | Hammesfahr | 16/332 |
| 3,522,970 | 8/1970 | Francis | 296/65 R |
| 3,973,799 | 8/1976 | Berg | 296/65 R |
| 4,527,828 | 7/1985 | Groce et al. | 296/63 |
| 4,627,656 | 12/1986 | Gokimoto et al. | 296/65 R |
| 4,652,051 | 3/1987 | Maruyama | 297/333 |
| 4,726,622 | 2/1988 | Palvölgyi | 297/379 |

FOREIGN PATENT DOCUMENTS

| | | | |
|---|---|---|---|
| 97908 | 4/1964 | Denmark | 16/332 |
| 2757230 | 5/1979 | Fed. Rep. of Germany | 16/332 |
| 982435 | 2/1965 | United Kingdom | 16/332 |

Primary Examiner—Nicholas P. Godici
Assistant Examiner—Edward A. Brown
Attorney, Agent, or Firm—Edward P. Barthel

[57] ABSTRACT

A hinge assembly for use in mounting an auxiliary seat on a vertical body wall of a vehicle such as a pickup truck extended cab. The hinge assembly comprises a seat-half banana hinge member and a body-half bracket hinge member for rotating the auxiliary seat between a first vertical stowed position and a second horizontal seating position. The bracket hinge has a pair of vertically extending side walls each formed with an oblique guide slot so as to movably support one end of a spring rod for reciprocal travel therein. A cam track having forward and rear notched detents is formed on each bracket hinge member side wall and is adapted for capturing a respective one of a pair of cam followers mounted adjacent each end of the spring rod. An over-center tension spring urges the cam followers into rolling engagement with their associated jump motion cam track providing quick-return capture of the followers into their associated forward or rear notched detents.

3 Claims, 2 Drawing Sheets

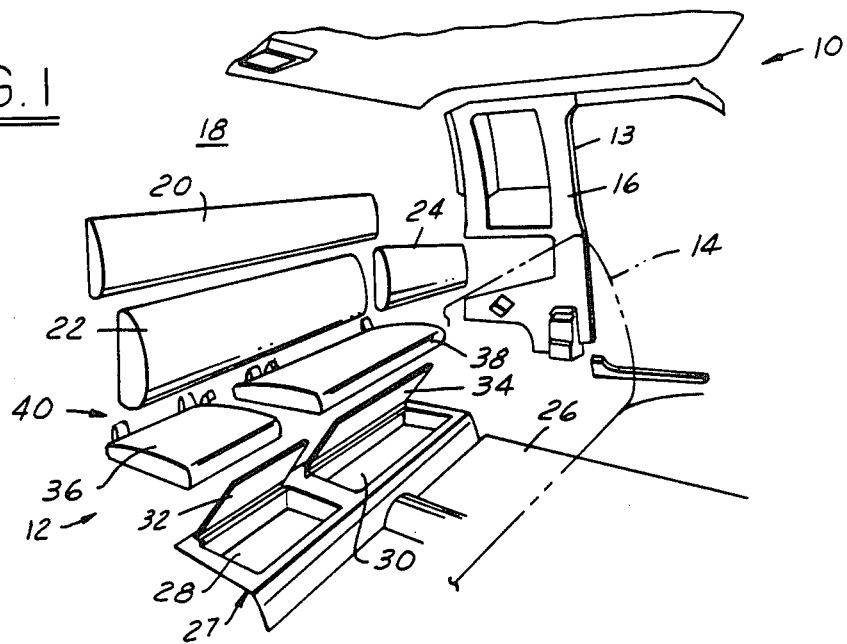
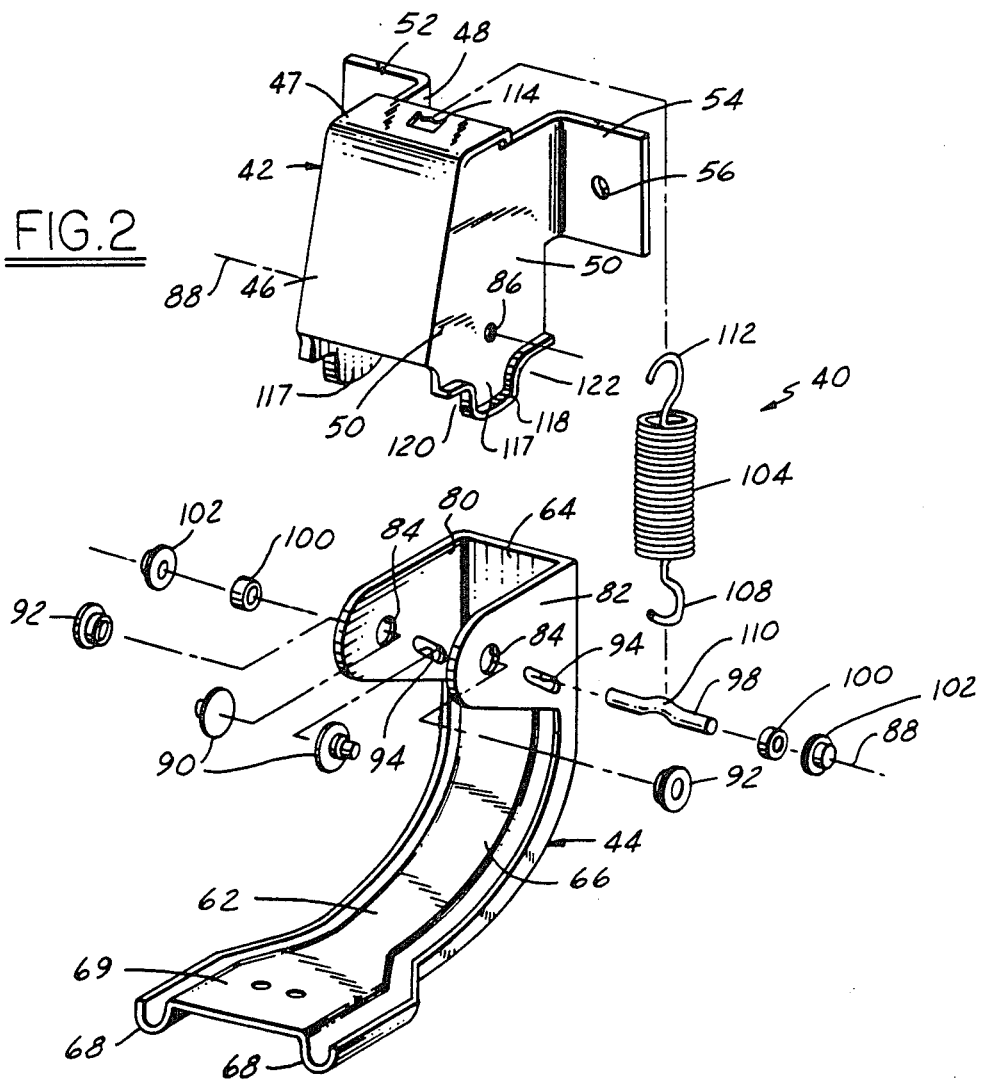

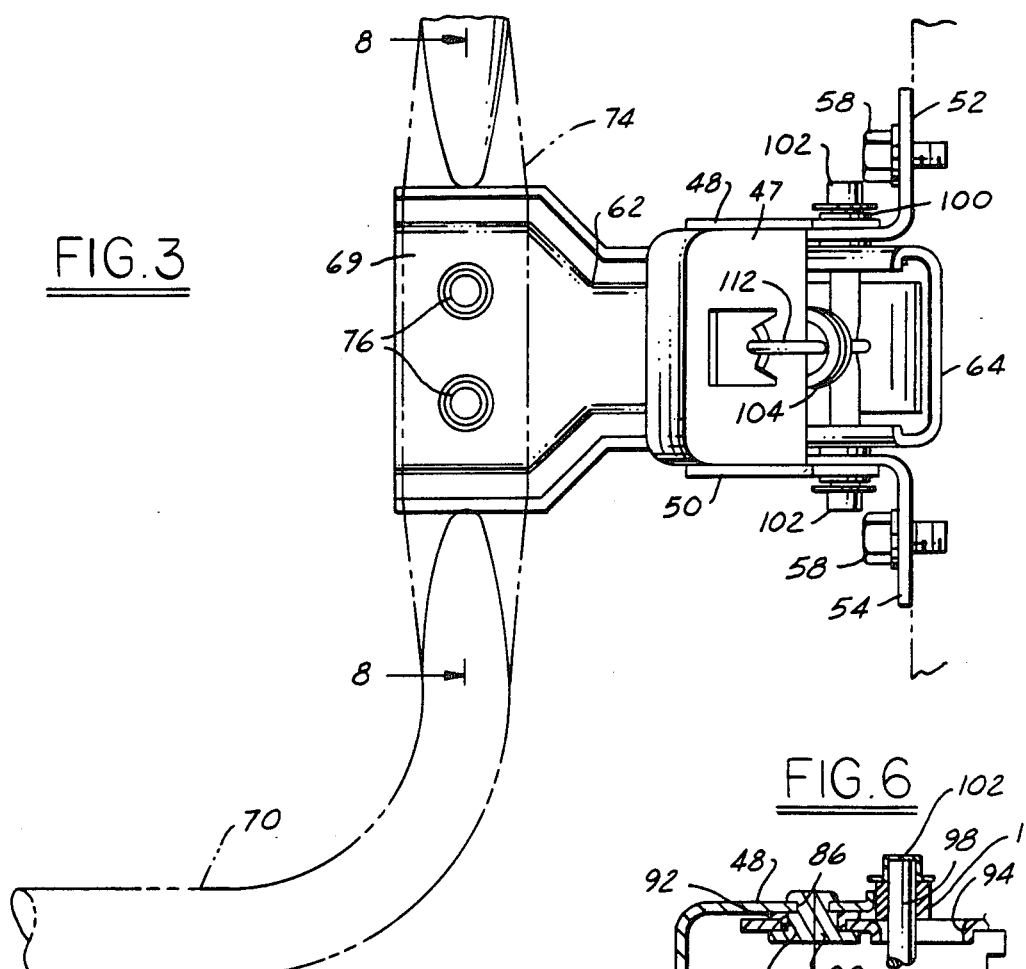

AUXILIARY FOLDING SEAT HINGE ARRANGEMENT

BACKGROUND OF THE INVENTION

The present invention relates to an auxiliary seat for an automotive vehicle, and more particularly to an auxiliary jump seat hinge mounting assembly which rotatably mounts a seat cushion unit on a vertical body wall structure for pivotal movement between folded and in-use captured positions.

It is well known in the prior art to provide foldable auxiliary or jump seats for use in vehicles. The U.S. Pat. No. 4,527,828 to Groce et al. discloses a side mounted jump seat for use with vehicles, such as pickup trucks, having extended cabs providing cargo space rearwardly of the front seat. In the Groce patent the seat assembly is supported in a cantilever manner when moved to its seating position and is swingable about a skewed axis away from the rear of the cab when moved to its seating position. The Groce seat assembly includes an overcenter spring which biasingly holds the seat in either a storage or seating position. One disadvantage of the Groce design is that it requires a large number of parts including a frame which must be secured to the vehicle floor structure.

The U.S. Pat. No. 4,639,037 to Maruyama et al. discloses a pickup truck auxiliary seat assembly which is foldably installed at the rear or lateral portion of the cab. The Maruyama auxiliary seat is mounted on a base which is installed on the cab floor so that when the seat cushion is turned to its upright position, the cushion upper surface is directed frontward of the seat assembly. Thus, the Maruyama assembly, like the above Groce patent, has the disadvantage of requiring a floor mounted support.

SUMMARY OF THE INVENTION

An important object of the present invention is to provide an improved hinge assembly for use in vehicles which enables an auxiliary seat to be readily mounted on a vertical wall structure of the vehicle body so that the floor space left clear by the seat is not obstructed when the seat is folded to its essentially vertical stowed position.

It is another object of the present invention to provide a new and improved hinge mounting assembly for a vehicle auxiliary seat wherein the seat pivots between a first essentially vertical stowed position and a second occupant seating position essentially parallel to the vehicle floor. The hinge mounting assembly includes a cam truck and cam follower arrangement in combination with an overcenter tension spring. In its stowed position the seat is biasingly urged into dampened contact with the seat back cushion while in its seating position it is urged into dampened contact with a carpeted surface assuring stability of the seat in either of its two positions. As a result any rattlling noises resulting from manufacturing tolerances of the invention are eliminated. In its seating position the seat frame is supported directly on a box-like vehicle storage structure whereby the hinge mounting assembly is not subjected to any force resulting from loads applied by an occupant of the seat.

A further object of the present invention is to provide a easily separable, economical seat hinge assembly for a vehicle wall mounted auxiliary folding seat. Each hinge mechanism comprises a lower seat-half banana hinge member including parallel knuckle portions having mirror image elongated guide slots formed therein supporting a spring rod for linear reciprocal movement along the slots. An upper body-half bracket hinge member is adapted to be mounted on a vehicle wall and includes a pair of side wall portions sized to receive the knuckle portions therebetween. Each side wall portion is pivotally connected to an associated knuckle portion for rotational movement about a horizontal pivot axis. A two position jump motion cam track, having forward and rearward quick return notched detents, extends downwardly from the lower end of each bracket hinge wall portion to rollingly engage an associated cam follower mounted adjacent one end of the spring rod. An overcenter spring connected between the spring rod and the bracket hinge member urges the follower in either the forward or rearward notched detents. Thus, for example, the seat is adapted for manual pivotal movement in an upward path between its horizontal seating position to its vertical stowed position. This is achieved by virtue of the spring rod's travel allowing the cam followers to roll out of their respective cam track rearward notched detents against the urging of the overcenter spring into an arcuate portion of the cam track for jump motion quick-return capture in their respective forward notched detents.

BRIEF DESCRIPTION OF THE DRAWINGS

Other features and advantages of the invention, such as reduced numbers of parts and improved service life, will be evident from the following detailed description of the preferred embodiment of the invention and the accompanying drawings wherein:

FIG. 1 is a fragmentary perspective view of a pickup truck interior showing the foldable seat assembly of the present invention in its seating position;

FIG. 2 is an exploded perspective view of a body-half bracket hinge member and its associated seat-half banana hinge member;

FIG. 3 is a fragmentary top elevational view of one of the hinge assemblies of FIG. 1 shown in its seating position with the seat cushion removed;

FIG. 6 is an enlarged detailed cross-sectional view taken substantially on the line 6—6 of FIG. 4;

FIG. 7 is an enlarged fragmentary detailed cross-sectional view of the spring rod;

FIG. 8 is a fragmentary front elevational view taken in the direction of arrows 8—8 of FIG. 3; and FIG. 9 is a fragmentary side elevational view taken in the direction of arrows 9—9 of FIG. 6.

DESCRIPTION OF THE PREFERRED EMBODIMENT

Figure 4:
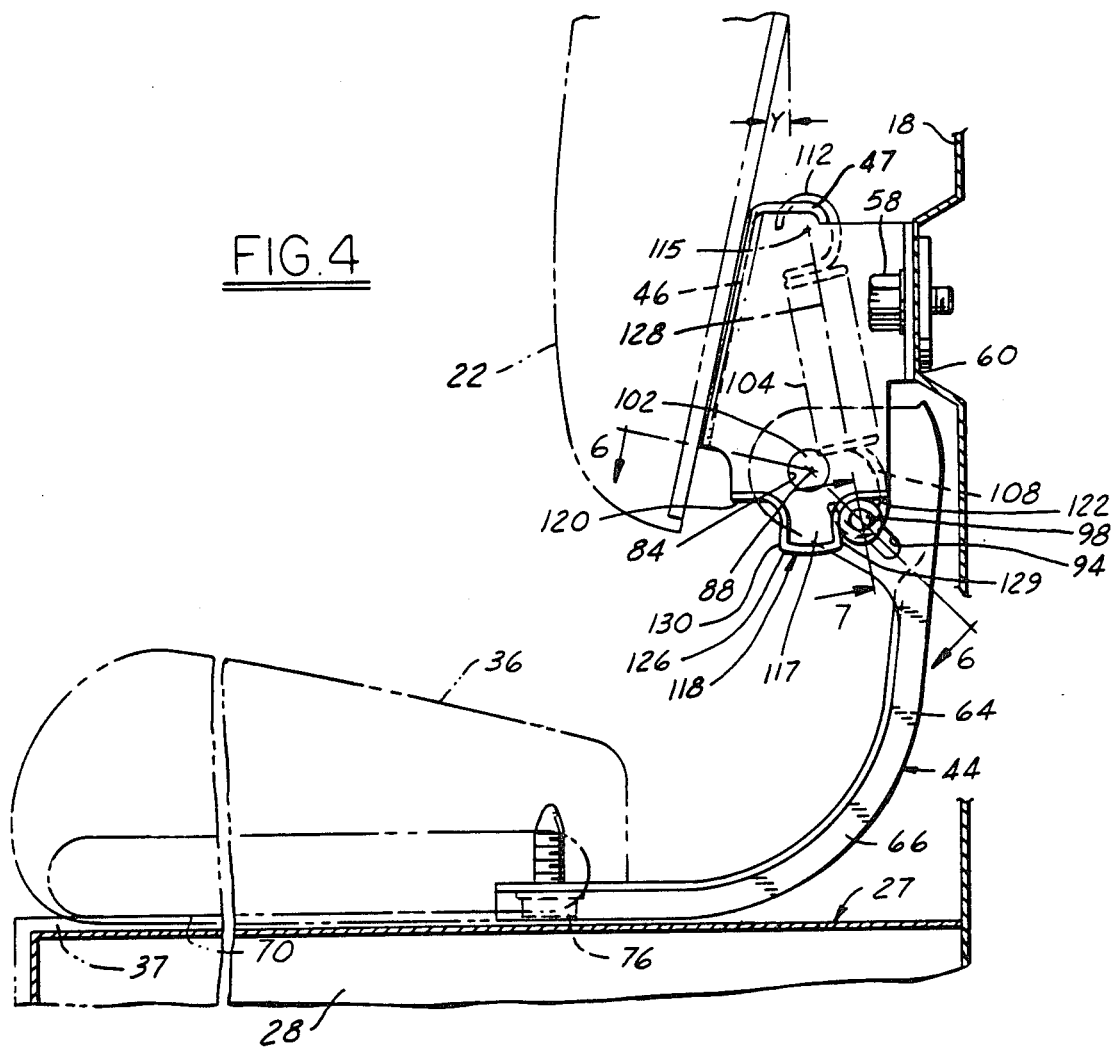
FIG. 4 is a fragmentary side elevational view of the hinge assembly of FIG. 3 with the seat cushion shown in phantom lines.

Referring now to the drawings, particularly to FIGS. 1 and 2, a portion of the interior of a pickup truck extended cab 10 is shown defining a cargo space 12 located behind front seats 14, indicated by phantom lines in FIG. 1. The cab has side walls with only the left or driver's side wall indicated at 16. Rear wall 18 of the cab supports an upper trim bolster 20 and a lower back rest cushion 22 together with a portion of a side wall wrap around bolster 24. The cab load floor 26 includes a raised box-like structure 27 defining a pair of cargo storage compartments 28 and 30 each provided with a hinged closure doors 32 and 34, respectively.

A pair of passenger and drive side auxiliary jump or folding rear seats 36 and 38, respectively are shown affixed on the rear wall 18 below the trim bolster 20 and back rest cushion 22. Each of the seats 36 and 38 are supported by a pair of horizontally spaced hinge mounting assemblies, generally indicated at 40 in FIGS. 1 and 2. In the disclosed embodiment the driver's side rear seat 38 has a larger transverse dimension than the passenger side rear seat 36. The transverse dimensions of the seats is a matter of choice in design and other arrangements could be provided without departing from the scope of the invention. As the pair of hinge mounting assemblies 40 for each rear seat are identical only one hinge assembly will be shown and described in detail.

As seen in FIG. 2 the hinge assembly 40 comprises an upper body-half bracket hinge member generally indicated at 42, and a lower seat-half banana hinge member generally indicated at 44. The body-half bracket hinge member 42 has a generally box-shaped channel configuration formed as a one-piece stamped sheet metal member. The bracket hinge member 42 includes a sloped bright wall 46 extending outwardly and downwardly from an upper horizontally disposed integral flange portion 47. The bight wall 46 is integrally formed with a pair of spaced vertically extending left and right side wall portions 48 and 50, respectively. Each side wall portion 48 and 50 terminates at its rearward end in an outwardly directed right angled mounting flange 52 and 54, respectively. Each side wall has a bolt hole 56 adapted to receive a suitable fastener 58 (FIG. 4) for mounting to a vertical wall portion such as, for example, horizontally extending raised channel portion 60 formed in the cab rear wall 18.

As seen in FIG. 2, the hinge assembly lower banana hinge member 44 is generally L-shaped and also formed as a one-piece stamped sheet metal member. The hinge member 44 comprises a first 62 and second 64 leg portions extending at substantially right angles to each other from an intermediate arcuate portion 66. Parallel U-shaped strengthening rib portions 68 are formed along either side edge of the hinge member 44. It will be noted in FIG. 3 that the free end of the hinge member first leg is fan-shaped to provide a widened attachment surface portion 69. The portions 69 are adapted for securing each banana hinge member to an underlying seat frame portion of its associated auxiliary seat 36 or 38.

FIGS. 3 and 4 show a seat frame 70 for seat 36 formed in a generally rectangular shape from tubular steel stock. A transverse aft portion of the frame 70 is flattened at 74 adjacent each side providing planar areas for the flush attachment of th efan-shaped portion 69 of each banana hinge first leg by a pair of self tapping machine bolts 76. It will be noted in FIG. 4 that the seat 36 is shown supported on the horizontal portion of the box-like structure 27 which is preferably covered with carpeting indicated by phantom lines 37.

With respect to FIG. 2 it will be seen that the free end of banana hinge member second leg 64 is formed with a pair of vertically extending hinge side flanges or knuckles 80 and 82, respectively, projecting therefrom. The hinge knuckles are mirror images with each formed with a pivot hole 84 adjacent its distal or free end. The hinge knuckles 80 and 82 are laterally spaced for juxtaposed reception between the side wall portions 48 and 50 of its associated bracket hinge member 42. The side wall portions 48 and 50 each have a hole 86 aligned on horizontal hinge pivot axis 88 shown in FIGS. 2 and 6.

The banana hinge knuckle pivot holes 84 are adapted to lie on the pivot axis 88 in alignment with side wall holes 86. Thus, each pair of holes 84 and 86 are aligned for the reception therethrough of a suitable pintle which in the disclosed embodiment is a shoulder rivet 90. Each rivet 90 extends through a plastic journal bushing 92, as best seen in FIG. 6, formed with a flange which uniformly spaces the hinge member.

Each hinge knuckle 80 is formed with an elongated guide slot 94 extending obliquely at a predetermined angle "X" from the horizontal with the hinge assembly in its seating mode shown in FIGS. 4 and 8. Each guide slot 94 is located intermediate its associated distal pivot hole 84 and proximate end of its knuckle adjacent hinge second leg portion 64. As best seen in FIG. 9 each guide slot 94 has its major axis 96 lying in an oblique plane common to the pivot axis 88 of rivets 90. In the disclosed embodiment the angle "X" is about 45 degrees.

FIGS. 6 and 7 show a horizontally disposed rod 98 extending between the hinge knuckle portions 80 and 82 with its free ends extending through an associated slot 94. A cam follower 100 in the form of a metal roller, preferably made from steel bearing material, is rotatably mounted adjacent each free end of the spring rod 98 outboard of its associated body-half hinge side wall portions 48 and 50. Each follower 100 is journally retained on the spring rod 98 such as by a Tinnerman type hat-shaped washer 102, for example, adapted to be removably press-fitted thereon.

A helocal coiled tension overcenter spring shown at 104 in FIG. 2, is provided for each hinge assembly. Each overcenter spring 104 has its lower arcuate hooked end 108 pivotally connected to a bowed portion 110 formed at the mid-point of the spring rod 98. The overcenter spring 104 has its upper arcuate hooked end 112 engaging a generally rectangular shaped lanced aperture 114 formed in upper flange 47 of the body-half bracket hinge member 42.

As seen in FIG. 2 each side wall 48 and 50 of the body-half bracket hinge member 42 has a mirror image depending lobe-shaped wall portion 117 defining a fixed cam track portion, generally indicated at 118, providing forward 120 and rearward 122 cam track notched detents. With reference to FIG. 9, it will be seen that each cam track has a profile which is symmetrical about a vertically extending plane defined by construction line 124, which plane includes the pivot axis 88. The detents 120 and 122 are sized to capture an associated cam follower 100 therein as each roller rides in rolling contact on its respective cam track portion 118. It will be appreciated that the tension overcenter spring 104 is operative to resiliently bias or hold each pair of cam followers 100 into rolling contact with its associated cam track 118. In FIG. 9, an intermediate ramp portion 126 of the cam track is defined by an arcuate path generated by a radius "R" with its center of curvature on the pivot axis 88.

Thus, upon rotation of the seat 36 and its pair of seat-half banana hinges 42 the cam followers 100 are urged into one or the other of its associated forward 120 or rearward 122 cam notched detents as the spring rod 98 moves along the guide slot 94. It will be noted that the spring rod 98 travels lengthwise back and forth along an intermediate portion of the linear guide slots 94 and does not travel the entire length of the slots. That is the guide slots 94 are of sufficient length to permit free reciprocal movement of the spring rod 98 therein without contacting either end of the guide slots.

Figure 5:
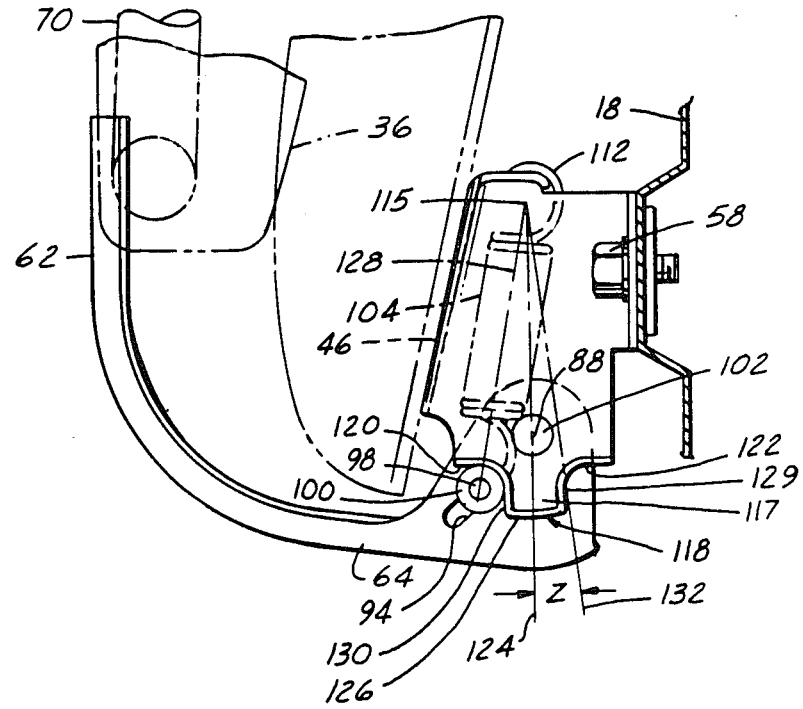
FIG. 5 is a view similar to FIG. 4, with the hinge assembly shown in its stored position.

With the cam followers 100 captured and biasingly held in their associated forward notched detents 120 by the overcenter spring 104, the seat 36 is oriented in its vertical stowed position of FIG. 5. It will be observed that the seat in its stowed position three is provided a cushioned interference or dampened contact between the seat 36 and the backrest cushion 22. This cushioned or dampened contact is designed-in to stabilize the seat in its two positions insuring that there is no movement or noise as the result of vibration and forces imported to it by the movement of the vehicle.

Folding the seat 38 downwardly is accomplished by grasping the upper portion of the seat and rotating it in a counter clockwise direction, as viewed in FIG. 4. This results in the cam followers 100 being forced out of their forward notched detents 120, against the urging of the overcenter spring 104. The followers 100 are captured in their associated rearward notched detents 120 by the quich-return jump motion caused by the spring force. The hinge design again provides an interference or dampened contact between the seat frame and the carpeting 37. This not only asures that the hinge assembly is not subjected to any force resulting from loads applied by an occupant but also obviates vibration noise in the same manner as the stowed position.

It will be noted in FIG. 4 that with the seat 36 in its substantially vertical stowed position, the principal axis of the spring 104, shown by construction line 128, intersects the principal axis of the spring rod. Further, the spring axis 128 is oriented intermediate the pivot axis 88 and its associated banana hinge second leg 64 with the follower 100 in rearward detent 122 and the seat 36 located essentially horizontal in its seating position. With reference to FIG. 5, the spring axis 128 is oriented intermediate its associated bight wall 46 and the pivot axis 88 with the follower in forward detent 120 and the seat located essentially vertical in its stowed position in dampened contact with the backrest 22.

As best seen in FIG. 5, the cam track lobe shaped portion 117 defines a rearward radial cam track portion 129 and a forward radial track portion 130. Each radial cam track portion defines an angle of climb, indicated by acute angle "Z" in FIG. 5, which in the disclosed form is about three degrees from the vertical. The angle "z" is defined by the construction lines 124 and 132 which intersect at the spring upper hook pivotal axis 115 of the spring upper hooked end 112. By virtue of the cam track angle of climb "Z", applicants' arrangement enables the spring to be designed with minimal tension with respect to the material strength of the cam lobe-shaped wall portions 117 and hinge side flanges 80 and 82.

With reference to FIGS. 4 and 5, it will be seen that the seat backrest cushion 22 has a base structure in the form of a backing panel 130 supported in a flush manner on the sloped bight wall 46. By virtue of this arrangement the pair of the bracket hinge members 42 are not only concealed from view behind the back rest cushion 22 but support the cushion backing panel 130 at a desired comfort angle which in the preferred embodiment defines an angle "Y" of the order of 15 degrees from the vertical.

As mentioned above, a feature of the wall mounted hinge assembly is that the upper surface of the box-like structure 27 is left unobstructed when the seat is folded in its stowed position. Thus, the clear cargo space 12 provided allows ready access to the storage compartments 28 and 30 by means of the hinged closure doors 32 and 34.

Although the present invention has been shown and described with reference to a preferred embodiment thereof, and in terms of the illustrative drawings, it should not be considered as limited thereby. Thus, various possible modifications, omissions, and alternatives could be conceived by one skilled in the art without departing from the scope of the present invention. Therefore, the scope of the invention should be defined solely by the scope of the appended claims which follow.

What is claimed is:

1. A hinge assembly for pivotally mounting an auxiliary seat on a vehicle body vertically disposed wall structure, said seat including a cushion having front and rear ends and underlying support frame means, said hinge assembly comprising:

a pair of spaced body-half bracket hinge members, each said body-half hinge member in the form of a vertically extending box-shaped channel having a bight wall interconnecting a pair of parallel mirror image side wall portions extending rearwardly therefrom;

each said bracket hinge member adapted to be secured to a vehicle body wall with each of its side wall portions having a hole aligned on a horizontal pivot axis;

a pair of L-shaped seat-half banana hinge members, each said banana hinge member having first and second legs extending at substantially right angles to each other, each said first leg connected to the seat frame means so as to lie substantially in the plane in which said frame means lies;

each said second leg formed with a pair of spaced apart mirror image hinge knuckle portions projecting vertically outwardly therefrom, each said pair of knuckle portions sized for reception between its associated pair of bracket hinge member side wall portions, each said knuckle portion having a pivot hole aligned on said pivot axis, pintle means extending through each side wall portion hole and through its associated knuckle portion hole, each said knuckle portion having an elongated guide slot formed therein extending obliquely at a predetermined angle from the horizontal such that each pair of knuckle portion guide slots having their major axes lying in an oblique plane common to said pivot axis, a spring rod extending between each said pair of knuckle portions with its free ends extending through an associated one of said guide slots, and a helical coiled overcenter tension spring connecting the mid-point of each said spring rod with its associated bracket hinge member such that said spring having its principle axis substantially aligned on the axis of said spring rod wherein said spring rod is normally resiliently biased toward said pivot axis, each said side wall portion having a depending ear-like portion defining an arcuate shaped cam track with forward and rearward jump motion notched detents formed therein;

a cam follower rotatably mounted adjacent the free ends of each said spring rod outboard of its associated bracket hinge side wall portion, said spring urging each said cam follower into rolling contact with its associated cam track providing quick-return capture of each said cam follower into its associated forward or rearward notched detent;

each said over center tension spring operative to biasingly capture its associated pair of cam followers into either their associated forward or rearward cam track notched detents, such that with each said pair of cam followers captured in their associated forward notched detents the principal axis of said spring is oriented intermediate its associated bight wall and said pivot axis with the seat located essentially vertically in its stowed position, and such that with each said pair of cam followers captured in their associated rearward cam detents the principal axis of said spring is oriented intermediate said pivot axis and its associated banana hinge second leg with the seat located essentially horizontal in its seating position;

whereby said seat being adapted for manual rotational movement about said pivot axis between said stowed position wherein each said cam follower is rolled out of its associated rearward notched detent against the action of said spring, and wherein the cam track jump motion providing quick-return capture of each said cam follower into its associated forward notched detent by said spring biasing force permitting ready movement of said seat from its stowed position to its seating position and vice versa against the action of said overcenter tension spring.

2. The hinge assembly as set forth in claim 1, wherein said guide slot predetermined angle is about 45 degrees from the horizontal.

3. The hinge assembly as set forth in claim 1 wherein each said body-half bracket hinge member bight wall portion sloped outwardly and downwardly from an upper horizontally disposed integral flange portion at a comfort angle of about 15 degrees from the vertical, each said sloped bight wall adapted to support a portion of a backrest cushion base structure in a flush manner thereon, whereby the bracket hinge members are concealed from view while supporting the backrest cushion at said confort angle on the vertically disposed wall structure.

* * * * *

UNITED STATES PATENT AND TRADEMARK OFFICE

Certificate

Patent No. 4,771,507                                                        Patented: September 20, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:
Thomas E. Draplin, Janice E. Cote, Matthew E. Dukatz and Dennis M. Viscome.

Signed and Sealed This 19th Day of December 1989.

NICHOLAS P. GODICI

*Supervisory Patent Examiner*
*Art Unit 325*